US008634184B2

(12) United States Patent
Kim et al.

(10) Patent No.: US 8,634,184 B2
(45) Date of Patent: Jan. 21, 2014

(54) PORTABLE APPARATUS AND SLIDING DEVICE THEREOF

(75) Inventors: Won-Tae Kim, Gyeonggi-do (KR); Sung-Ho Ahn, Seoul (KR); Seok-Gyu Lee, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 564 days.

(21) Appl. No.: 12/946,966

(22) Filed: Nov. 16, 2010

(65) Prior Publication Data

US 2011/0193783 A1    Aug. 11, 2011

(30) Foreign Application Priority Data

Feb. 8, 2010    (KR) .................. 10-2010-0011548

(51) Int. Cl.
*H05K 5/00*    (2006.01)
*H05K 7/00*    (2006.01)
*G06F 1/16*    (2006.01)
*H04M 1/00*    (2006.01)

(52) U.S. Cl.
USPC ................. 361/679.3; 361/679.56; 455/575.4

(58) Field of Classification Search
USPC ............ 361/679.3, 679.56; 455/575.1, 575.4
See application file for complete search history.

(56) References Cited

U.S. PATENT DOCUMENTS

| 7,889,483 B2 * | 2/2011 | Sip et al. ................. 361/679.11 |
| 2009/0093285 A1 * | 4/2009 | Weng et al. ................ 455/575.4 |
| 2009/0312076 A1 * | 12/2009 | Lim ........................... 455/575.4 |
| 2010/0210311 A1 * | 8/2010 | Ahn et al. ..................... 455/566 |

FOREIGN PATENT DOCUMENTS

| KR | 2008-79574 | 9/2008 | .............. H04B 1/38 |
| KR | 2009-89259 | 8/2009 | .............. H04B 1/38 |

* cited by examiner

*Primary Examiner* — Anthony Haughton
(74) *Attorney, Agent, or Firm* — Cha & Reiter, LLC

(57) ABSTRACT

Disclosed is a sliding-type portable apparatus and a sliding device of the sliding-type portable apparatus. The portable apparatus includes a main body, a display unit, and a sliding device, in which the sliding device enables the automatic sliding of the keypad unit according to the sliding of the display unit. Further, the portable apparatus includes a driving unit to semi-automatically open/close the display unit and the keypad unit.

18 Claims, 7 Drawing Sheets

2

PORTABLE APPARATUS AND SLIDING DEVICE THEREOF

CLAIM OF PRIORITY

This application claims priority under 35 U.S.C. §119(a) to a Korean Patent Application entitled "Portable Apparatus and Sliding Device Thereof" filed in the Korean Intellectual Property Office on Feb. 8, 2010 and assigned Serial No. 10-2010-0011548, the contents of which are incorporated herein by reference in its entirety.

BACKGROUND OF THE INVENTION

1. Field of the Invention

The present invention relates to a portable apparatus including a notebook, a PDA, a radiotelegraph, an MP3 player, a PMP, a cellular phone, a smart phone, etc., and in particular to a sliding device of the portable apparatus.

2. Description of the Related Art

In general, a portable apparatus needs be light and compact for convenient portability. As the multimedia is introduced in today's environment, functions such as video call, game play, VOD, TV broadcasting, or the like, as well as the traditional voice call and short message transmission are desired. To this end, a portable apparatus enabling the watching of various-mode contents has been developed.

In the UI environment related to the input/output of the data, it is convenient to view an image when the image is displayed on the wide display unit and operate the key using larger and numerous keys in the wide keypad.

In order to satisfy the demands of the user, the portable apparatus can be classified into a bar-type, a folder-type, and a sliding-type. In particular, due to the advantage in mounting the wide display unit and the wide keypad unit, the development of the widthwise sliding-type portable apparatus has prevailed over the lengthwise sliding-type portable apparatus.

The widthwise sliding-type portable apparatus generally includes a main body and a sliding body slidably coupled to the main body, in which the main body includes the keypad and the sliding body includes the display unit. The widthwise sliding-type portable apparatus has a structure in which the keypad is opened/closed according to the sliding of the sliding body, and a sliding device is formed between the main body and the sliding body, so that the main body is connected with the sliding body.

However, the conventional widthwise sliding-type portable apparatus has a plurality of keys, e.g. keys arranged in a QWERTY key array, arranged on the main body, and includes the sliding device, so that there is a limitation in the sliding excursion of the sliding body and in an arrangement region of the keypad unit. That is, a region size for mounting the keypad unit decreases and consequently, the size of each key becomes smaller and inconvenient for the key operation, e.g. pressing or touching the keys.

Further, the conventional widthwise sliding-type portable apparatus includes a flexible circuit for electrically connecting the main body with the sliding body. However, the flexible circuit is directly exposed to an external environment which in turn becomes a cause for deterioration in long run.

SUMMARY OF THE INVENTION

Accordingly, the present invention has been made at least in part to solve the above—stated problems occurring in the prior art and to provide additional advantages, by providing a portable apparatus having a sliding device, in which a display unit and a keypad unit slide up and down at the same time so that a wider keypad mounting space can be secured in a widthwise sliding-type portable apparatus.

The present invention also provides a portable apparatus and a sliding device of the portable apparatus, in which a display unit and a keypad unit share an sliding excursion distance, respectively, so that it is possible to achieve the entirely long excursion in the widthwise sliding-type portable apparatus.

Further, the present invention provides a portable apparatus and a sliding device of the portable apparatus, in which a display unit and a keypad unit can be semi-automatically opened and closed at the same time for convenience.

In accordance with an exemplary aspect of the present invention, a portable apparatus includes: a main body; a display unit arranged on the main body to slide in one direction; a keypad unit arranged on the main body to automatically slide in a reverse direction according to the sliding of the display unit; a sliding device for sliding the display unit and automatically sliding the keypad unit according to the sliding of the display unit on the main body.

In accordance with another aspect of the present invention, a sliding device of a sliding-type portable terminal includes a main body, a display unit sliding in one direction on the main body, and a keypad unit arranged on the main body to simultaneously slide in a reverse direction responsive to the sliding of the display unit. The sliding device further includes: a fixing plate formed on the main body; a connection frame integrally connected with a display unit plate formed in a lower surface of the display unit in a down direction of the display unit plate and sliding-guided by a first guide while facing the fixing plate; a keypad frame positioned between the display unit plate and the connection frame and sliding-guided by a second guide while facing the connection frame and the display unit plate; a driving unit formed between the fixing plate and the connection frame to provide power for semi-automatically sliding the display unit plate and the keypad frame; and a connection rotation unit mounted between the keypad frame and the connection frame so as to enable the sliding of the keypad frame in a reverse direction responsive to the sliding of the display unit plate.

In accordance with another exemplary aspect of the present invention, a sliding device of a sliding-type portable terminal includes: a main body; a display unit arranged on the main body; a connection frame integrally connected with the display unit in a down direction and sliding-guided by a first guide while facing the main body; a keypad arranged between the display unit and the connection frame and sliding-guided by the second guide while facing the connection frame; a driving unit formed between the main body and the connection frame to provide power for semi-automatically sliding the display unit and the keypad; and a connection rotation unit mounted between the keypad and the connection frame so as to enable the sliding of the keypad in a reverse direction responsive to the sliding of the display unit.

In accordance with yet another exemplary aspect of the present invention, a sliding device of a sliding-type portable terminal includes: a main body, a display unit sliding in one direction on the main body, and a keypad unit mounted on the main body to simultaneously slide in a reverse direction according to the sliding of the display unit. The sliding device includes a fixing plate formed on the main body; a connection frame integrally connected with a display unit plate formed in a lower surface of the display unit in a down direction of the display unit plate and sliding-guided by a first guide while facing the fixing plate; a keypad frame positioned between the display unit plate and the connection frame and sliding-guided by a second guide while facing the connection frame and the display unit plate; and a connection rotation unit mounted between the keypad frame and the connection frame so as to enable of the sliding of the keypad frame in a reverse direction responsive to the sliding of the display unit plate.

In accordance with still another exemplary aspect of the present invention, a sliding device of a sliding-type portable terminal includes: a main body; a display unit arranged on the main body; a connection frame integrally connected with the display unit in a down direction and sliding-guided by a first guide while facing the main body; a keypad frame positioned between the display unit and the connection frame and sliding-guided by a second guide while facing the connection frame; and a connection rotation unit mounted between the keypad and the connection frame so as to enable the sliding of the keypad in a reverse direction responsive to the sliding of the display unit.

BRIEF DESCRIPTION OF THE DRAWINGS

The above and other exemplary aspects, features and advantages of the present invention will be more apparent from the following detailed description taken in conjunction with the accompanying drawings, in which.

DETAILED DESCRIPTION OF THE INVENTION

Hereinafter, the construction of a widthwise sliding-type portable apparatus and a sliding device of the portable apparatus according to the present invention will be described with reference to the accompanying drawings.

Figure 1:
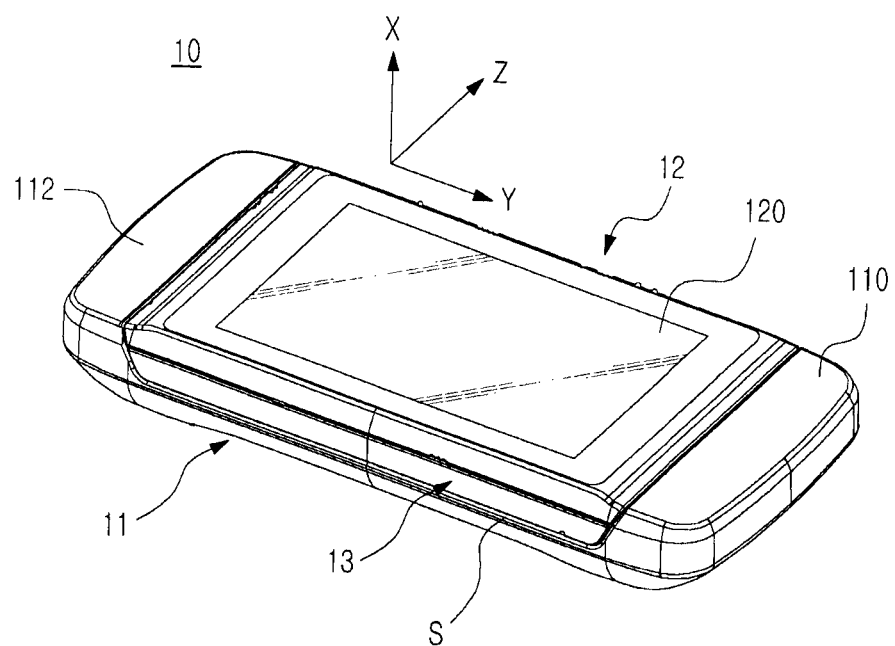
FIG. 1 is a perspective view illustrating a portable apparatus in a closed state according to an exemplary embodiment of the present invention.
Figure 2:
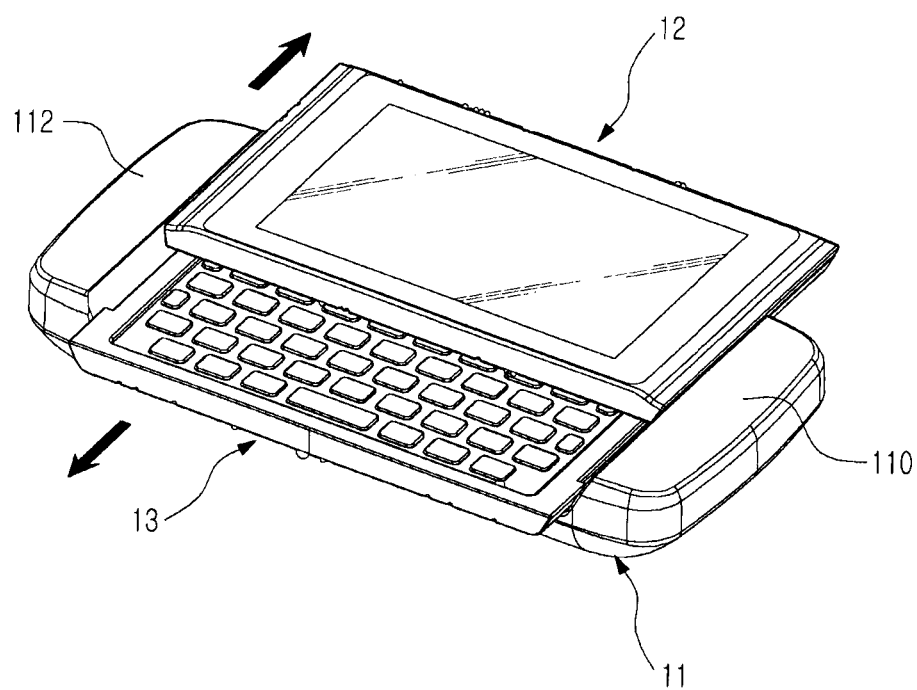
FIG. 2 is a perspective view illustrating a portable apparatus in a state in which a display unit and a keypad unit slide according to an exemplary embodiment of the present invention.
Figure 3:
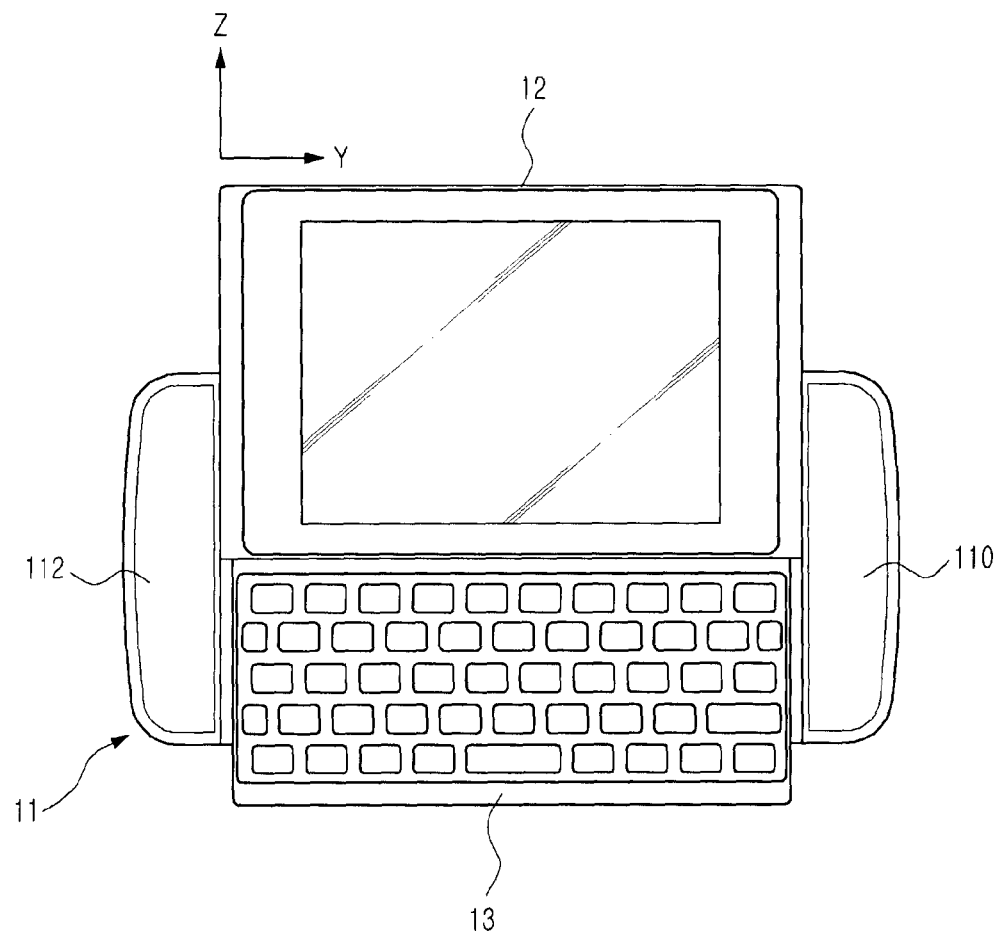
FIG. 3 is a perspective view illustrating a portable apparatus in a complete open state according to an exemplary embodiment of the present invention.

Referring to FIGS. 1 to 3, the portable apparatus 10 according to the present invention is a widthwise sliding-type, in which the display unit 12 and the keypad unit 13 slide vertically in relation to the main body 11. FIG. 1 illustrates the closed-state portable apparatus, FIG. 2 illustrates the sliding-state portable apparatus, and FIG. 3 illustrates the fully sliding state of the portable apparatus. As shown FIG. 1, an X axis represents a vertical direction, a Y axis represents a horizontal direction, in particular, a length direction of the main body 11, and a Z axis represents a sliding direction of the display unit and the keypad unit.

Referring to FIGS. 1 through 3, the portable apparatus 10 according to the present invention includes the main body 11, the sliding unit 12 and 13, a sliding device (shown in FIG. 4) mechanically connecting the main body 11 and the sliding unit 12 and 13. The sliding unit 12 and 13 includes the display unit and the keypad unit, respectively, an d the keypad unit 13 automatically slides according to the sliding of the display unit 12.

The main body 11 has a slot at a center thereof, on which the display unit 12 and the keypad 13 are seated. In operation, the keypad unit 13 automatically slides according to the sliding action/motion of the display unit 12. The display unit 12 is disposed on the main body 11 and linearly slides in a vertical direction of a length direction of the main body 11. Further, the keypad unit 13 is disposed in parallel between the main body 11 and the display unit 12 so that the keypad unit 13 slides in a reverse direction of the sliding direction of the display unit 12 in response to the sliding motion of the display unit 12. That is, the keypad unit 13 automatically slides in a direction for moving the main body 11, and the display unit 12 away from each other according to the sliding of the display unit 12 in a direction away from the main body 11. Here, the term, 'automatically' means that the keypad unit 13 simultaneously slides according to the sliding action of the display unit 12.

The display unit 12 is formed with a display element that is always exposed on an upper surface of the display unit 12, and functions as an information input/output device. The display unit 12 can be configured with an LCD, OLED, AMOLED, or a touch panel. Opposite ends 110 and 112 of the main body 11, except for the display unit 12, can be used as gripping portions.

The keypad unit 13 is a data input/output device, on which a keypad with an arrangement of a plurality of keys, i.e. a keypad arranged in a QWERTY key array, is mounted or a touch screen is mounted. The keypad unit 13 is opened/closed according to the sliding action of the display unit 12. That is, if the display unit 12 slides, an opened area of the keypad unit 13 gradually increases. If the display unit 12 does not slide on the main body 11, the upper surface of the keypad unit 13 is closed by the display unit 12.

Further, the main body 11, the keypad unit 13, and the display unit 12 are stacked for mounting so that they linearly slide while maintaining their parallel states with each other.

The sliding device is mounted between the main body 11, the keypad unit 13, and the display unit 12. The sliding device will be described in detail with reference to FIG. 4.

Figure 4:
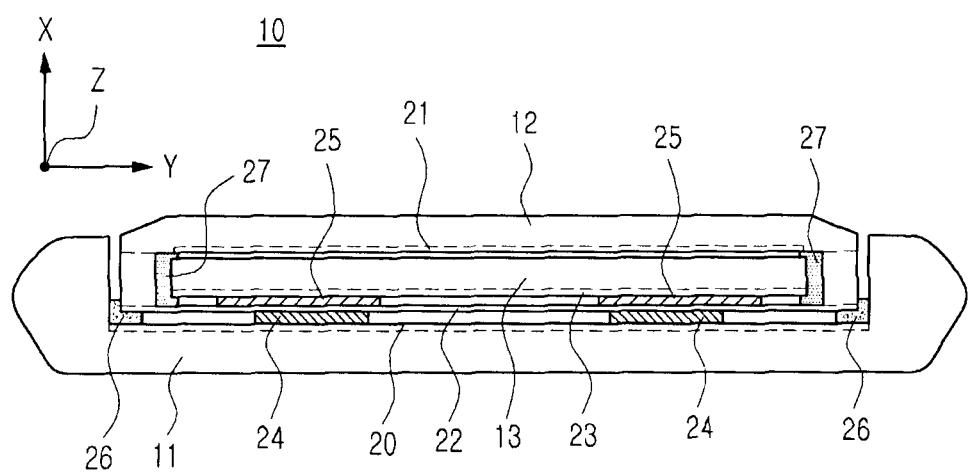
FIG. 4 is a view schematically illustrating an operation principle of a sliding device mounted on a portable apparatus according to an exemplary embodiment of the present invention.

Referring to FIG. 4, first, the operation principle of the sliding device for sliding of the display unit 12 and the keypad unit 13 of the portable apparatus 10 according to the present invention will be schematically described. The 'Z' axis in FIG. 4 represents the sliding direction.

As shown in FIG. 4, the sliding device according to the present invention is connected to the main body 11, the display unit 12, and the keypad unit 13 for the display unit 12, which slides on the main body 11 in one direction, and the keypad unit 13, which is disposed on the main body 11 and simultaneously slides in a reverse direction in response to the sliding action (an operation of pushing the display unit by a user) of the display unit 12.

The sliding device includes a holding plate 20 formed on the main body 11, display unit frames 21 and 22 formed on the display unit 12, a keypad frame 23, and a connection rotation unit 25. Further, the sliding device can include a driving unit 24 for semi-automatic sliding of the display unit 12 and the keypad unit 13. The afore-mentioned semi-automatic sliding implies that when a predetermined pushing force is applied to the display unit 12, the pushing force servers as a force for closing the display unit 12 within a distance equal to or less than a predetermined distance and also serves as a force for opening the display unit 12 beyond the predetermined distance.

The holding plate 20 is mounted on the main body 11 by means of a separate fastener.

The display frames 21 and 22 include the display unit plate 21 and a connection frame 22. The display unit frame 21 is formed at a lower surface of the display unit 12. The connection frame 22 is integrally connected with the display unit plate 21 in a down direction so that the connection frame 22 is sliding-guided by a first guide 26 while facing the holding plate 20. That is to say, the connection frame 22 is integrally connected with the display unit plate 21 so that the connection frame 22 slides together with the display unit 12 if the display unit 12 slides.

The keypad frame 23 is formed between the display unit plate 21 and the connection frame 22 so that the keypad frame 23 is sliding-guided by a second guide 27 while facing the connection frame 22 and the display unit plate 21.

The driving unit 24 is formed between the holding plate 20 and the connection fame 22 to provide power for semi-automatically sliding the display unit 12 and the display unit plate 21 as well as the keypad 13 and the keypad frame 23. Specifically, the sliding device includes a pair of driving units 24, which are symmetrically disposed relative to each other between an upper surface of the holding plate 20 and a lower surface of the connection frame 22. The detailed construction of the driving unit 24 will be described later.

The connection rotation unit 25 is formed between the keypad frame 23 and the connection frame 22, so that according to the sliding of the display unit plate 21 in one direction, the connection rotation unit 25 slides the keypad frame 23 in a reverse direction. The sliding device includes a pair of connection rotation units 25, which are symmetrically disposed relative to each other between a lower surface of the keypad frame 23 and an upper surface of the connection frame 22.

Therefore, the sliding device according to the present invention has a structure, in which the driving units 24 are disposed in parallel between the connection frame 22 and the fixing frame 20, the connection rotation units 25 are disposed in parallel between the keypad frame 23 and the connection frame 22, the keypad frame 23 faces the connection frame 22 in parallel, and the display unit plate 21 faces the keypad frame 23 in parallel, on the upper surface of the main body 11. In this state, if the display unit 12 slides by a pushing force of the user, the keypad unit 13 slides in a reverse direction of the pushing direction by the connection rotation units 25, and the display unit 12 and the keypad unit 13 semi-automatically slide by the driving units 24.

The construction of the sliding device according to the present invention will be described in detail with reference to FIG. 5 in detail.

Figure 5:
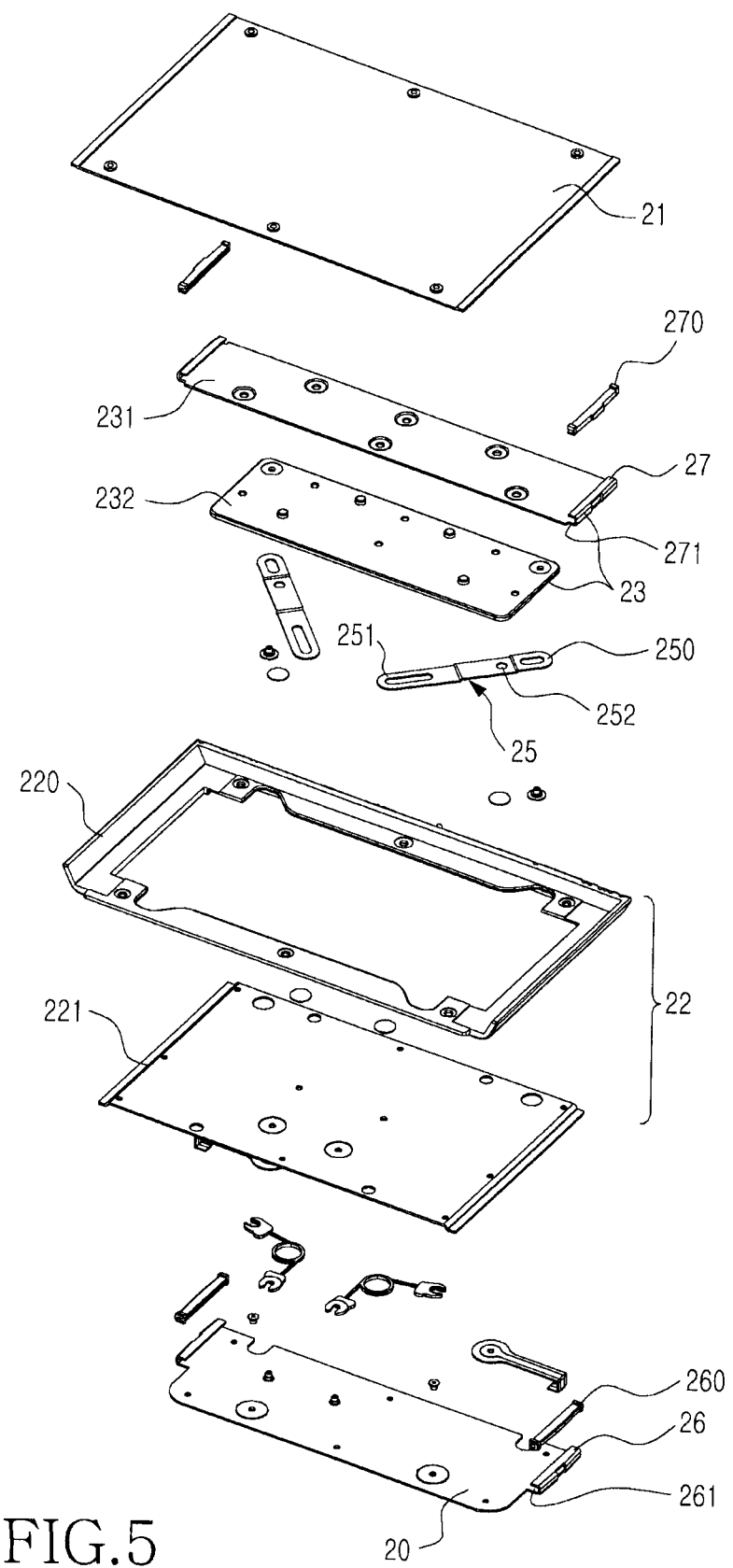
FIG. 5 is an exploded perspective view illustrating the construction of a sliding device mounted on a portable apparatus according to an exemplary embodiment of the present invention.

Referring to FIG. 5, the display unit frames 21 and 22 include the display unit plate 21 and the connection frame 22, in which the display unit plate 21 is integrally assembled with the connection frame 22 through a connection unit (not shown), to integrally move.

Both ends of the display unit plate 21 are assembled with second guides 27 (to be described later). The connection frame 22 includes a first frame 220 and a second frame 221. The second frame 221 is integrally assembled with the lower surface of the first frame 220 by means of the fastener. The second frame 21 is shaped like a plate.

The keypad frame 23 includes a keypad fixing plate 231 coupled to opposite ends of the display unit plate 21 by means of the second guides 27 and a keypad mounting plate 232 that is coupled to the keypad fixing plate 231. The second guides 27 are formed at opposite ends of the keypad fixing plate 231 so that the keypad fixing plate 231 guides the sliding while facing the display unit plate 21.

The driving unit 24 includes a spring, which includes one end 240 rotatably assembled with the holding plate 20, the other end 241 rotatably assembled with the connection frame 22, and a elastic coil part 242, which has one or more turns between the one end 240 and the other end 241 and applies the force for moving the one end 240 and the other end 241 away from each other.

The driving unit 24 includes a pair of springs, which are symmetrically disposed relative to each other so that it provides power for semi-automatically sliding the display unit plate 21 and the connection frame 22, and the keypad frame 23.

The connection rotation unit 25 includes a connection lever, which includes one end 250 rotatably assembled with the connection frame 22, the other end 251 rotatably assembled with the keypad frame 23, and a rotation shaft 252 located between the one end 250 and the other end 251. It is preferred that the rotation shaft 252 is formed at a position where a ratio of a distance between the one end 250 and the rotation shaft 252 to a distance between the other end 251 and the rotation shaft 252 is 3:1, which can be varied according to the sliding distance. The sliding device includes a pair of connection levers having the construction as described above, which are symmetrically disposed relative to each other so as to enable the simultaneously sliding of the display unit plate 21 in one direction and the keypad frame 23 in the other direction. Each of the connection levers has elongated holes formed at the one end 250 and the other end 251, respectively, so that the connection lever guides the movement of rotation protuberances inserted in the elongated holes formed at the one end 250 and the other end 251.

The first guides 26 are positioned between the holding plate 20 and the connection frame 22 and include guide rails 261 bent in a '⊏' shape at opposite ends of the holding plate 20. Further, the guide rails 261 are assembled with guide bars 260, which are made of a plastic material having an excellent mechanical processing property and an excellent friction resistance. The guide bars 260 pursue the smooth sliding of the connection frame 22. The guide bars 260 may be made of a material, such as POM.

The second guides 27 are positioned between the display unit plate 21 and the keypad frame 23 and include guide rails 271 bent in a '⊏' shape at opposite ends of the display unit plate 21. Further, the guide rails 271 are assembled with guide bars 270, which are made of a plastic material having an excellent mechanical processing property and an excellent friction resistance. The guide bars 270 pursue the smooth sliding of the display unit plate 21. The guide bars 270 may be made of a material, such as POM.

Figure 6:
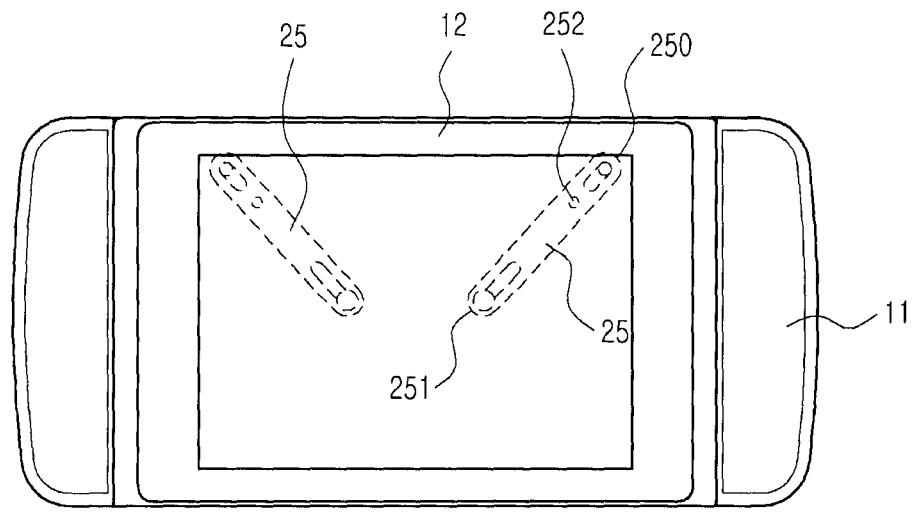
FIG. 6 is a view illustrating a state of a connection rotation unit mounted on a sliding device in a state in which a portable apparatus is closed according to an exemplary embodiment of the present invention.
Figure 7:
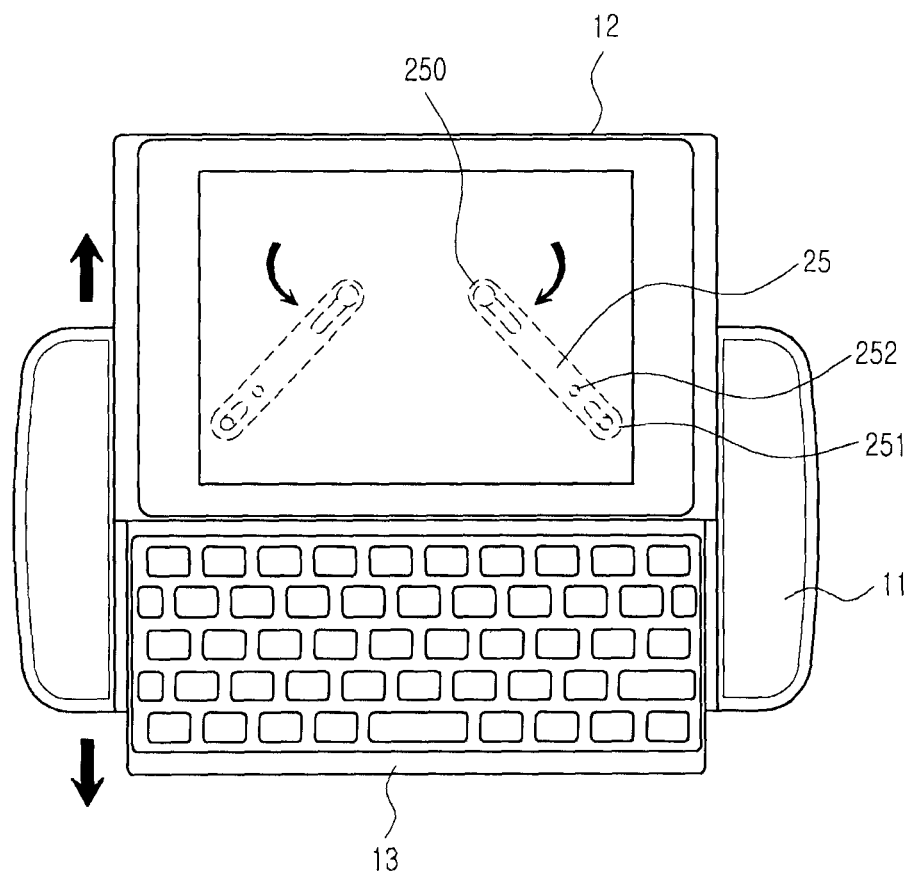
FIG. 7 is an example view illustrating a state of a connection rotation unit mounted on a sliding device in a state in which a portable apparatus is opened according to an exemplary embodiment of the present invention.

FIGS. 6 and 7 illustrate the example of the state of the connection lever 25 when the display unit 12 and the keypad unit 13 are in a closed state and in an opened state, respectively. FIG. 6 illustrates the portable apparatus in a closed state, and FIG. 7 illustrates the portable apparatus in an opened state. The connection lever 25 restrictively rotates according to the open/close of the display unit 11 about each of the rotation shafts 252. The rotation shafts 252 restricted to each of the elongated holes of the connection lever 25 are guided along the elongated holes.

Figure 8:
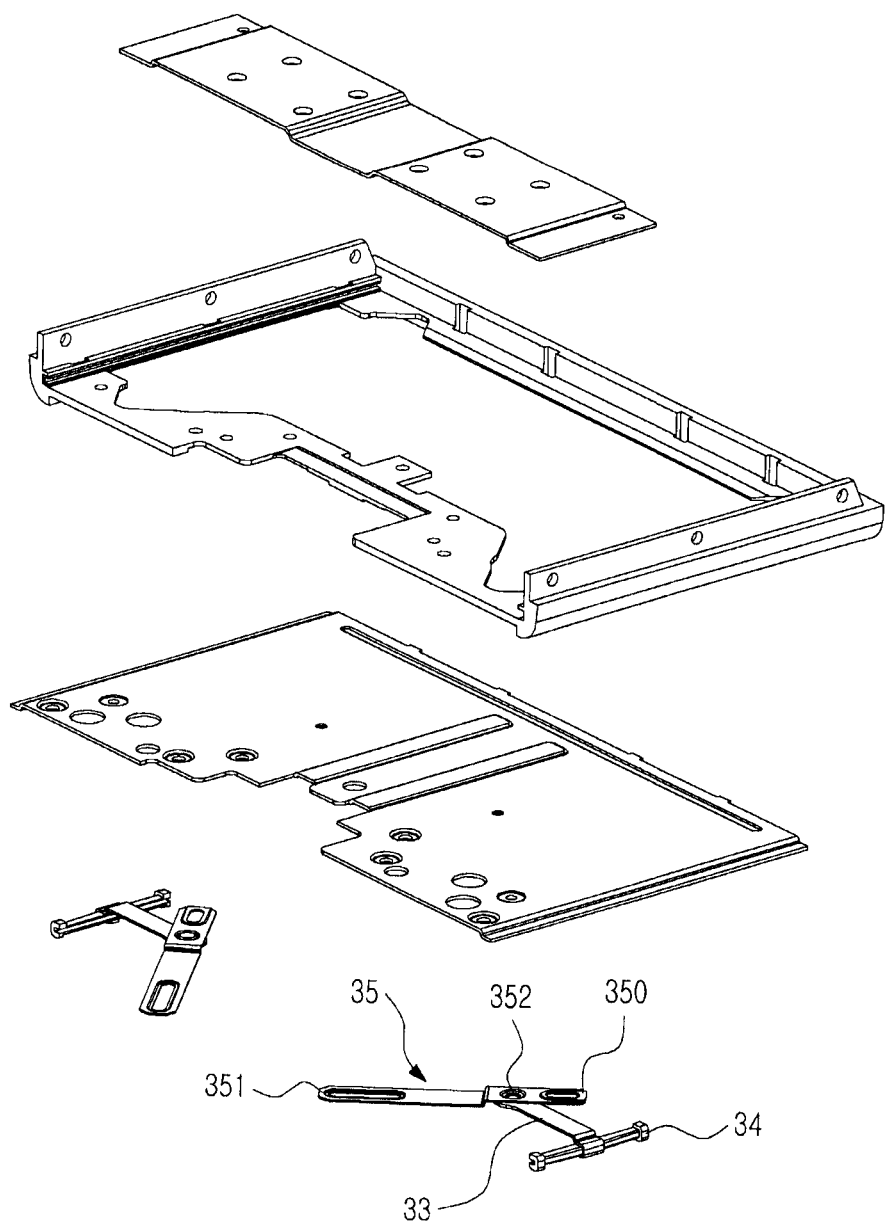
FIG. 8 is an exploded perspective view illustrating a connection rotation unit mounted on a portable apparatus according to another embodiment of the present invention.

FIG. 8 is an exploded perspective view illustrating the sliding device according to another embodiment of the present invention. The construction of the connection rotation unit 35 of FIG. 8 is different from that of the connection rotation unit 25 of FIG. 5, and the other constructions are same. Therefore, the connection rotation unit 35 and a mounting structure will be described only to avoid redundancy.

Referring to FIG. 8, the connection rotation unit 35 according to the present invention includes connection levers 35, supporting bars 34, and connection members 33. In particular, the connection rotation unit 35 includes the connection lever, which includes one end 350 rotatably assembled with the connection frame, the other end 351 rotatably assembled with the keypad frame, and a rotation shaft 352 positioned between the one end 350 and the other end 351, the supporting bars 34 indirectly connected to the rotation shaft 352 of the connection lever to support, and the connection members 33 for connecting the rotation shaft 352 with the supporting bar 34. The supporting bar 34 is assembled with the rotation shaft 352 in a length direction of opposite ends of the connection frame.

In addition, in the manufacturing of the sliding device, an additional fastener, e.g. a publicly-known rivet welding or a screw, or a publicly-known laser welding is used for assembling the frame or the plate made of the metallic material.

While the present invention has been shown and described with reference to certain exemplary embodiments and drawings thereof, it will be understood by those skilled in the art that various changes in form and details may be made therein without departing from the spirit and scope of the invention as defined by the appended claims.

What is claimed is:

1. A portable apparatus comprising:
   a main body;
   a display unit disposed on the main body to slide in one direction, with a display unit plate formed in a lower surface of the display unit;
   a connection frame integrally connected with the display unit plate,
   a keypad unit disposed on the main body to automatically slide in a reverse direction of the display unit, the keypad unit having a keypad frame, the keypad frame formed between the display unit plate and the connection frame, wherein the connection frame is guided by a first set of inwardly facing horizontal guide rails and wherein the keypad frame is guided by a second set of inwardly facing horizontal guide rails; and
   a sliding device for sliding the display unit and automatically sliding the keypad unit in response to the sliding of the display unit, wherein the display unit and the keypad unit each slide in parallel alignment.

2. The portable apparatus as claimed in claim 1, wherein the keypad unit and the display unit slidably move away from each other over the main body.

3. The portable apparatus as claimed in claim 1, wherein the display unit and the keypad unit slides away from each other from the main body so that a wider keypad mounting space can be secured in a widthwise direction of the portable apparatus.

4. The portable apparatus as claimed in claim 1, wherein the display unit is always exposed for viewing, and the keypad unit is opened/closed according to the sliding movement of the display unit.

5. A sliding device of a sliding-type portable terminal, which comprises a main body, a display unit sliding in one direction on the main body, and a keypad unit arranged on the main body to simultaneously slide in a reverse direction in response to the sliding of the display unit, the sliding device further comprising:
   a fixing plate formed on the main body;
   a connection frame integrally coupled with a display unit plate formed in a lower surface of the display unit in a down direction of the display unit plate and sliding-guided by a first set of inwardly facing horizontal guide rails while facing the fixing plate;
   a keypad frame positioned between the display unit plate and the connection frame and sliding-guided by a second set of inwardly facing horizontal guide rails while facing the connection frame and the display unit plate;
   a driving unit formed between the fixing plate and the connection frame to provide power for semi-automatically sliding the display unit plate and the keypad frame; and
   a connection rotation unit mounted between the keypad frame and the connection frame so as to enable the sliding of the keypad frame in the reverse direction in response to the sliding of the display unit plate in the one direction wherein the display unit and the keypad unit each slide in parallel alignment.

6. The sliding device as claimed in claim 5, wherein the driving unit comprises a spring, which comprises one end rotatably assembled with the fixing plate, another end rotatably assembled with the connection frame, and an elastic coil part, which has one or more turns between the one end and said another other end and applies power in a direction for moving the one end and said another end away from each other, wherein the driving unit includes a single spring, a plurality of springs, or a pair of springs symmetrically disposed relative to each other.

7. The sliding device as claimed in claim 5, wherein the connection rotation unit comprises a connection lever, which comprises one end rotatably assembled with the connection frame, another end rotatably assembled with the keypad frame, and a rotation shaft positioned between the one end and said another end, wherein the sliding device includes a single lever, a plurality of connection levers, or a pair of connection levers symmetrically disposed relative to each other, so that the connection lever enables the simultaneous sliding of the keypad frame in a reverse direction according to the sliding of the display unit plate in the one direction.

8. The sliding device as claimed in claim 7, wherein the connection lever comprises elongated holes formed at one end and another end of the connection lever.

9. The sliding device as claimed in claim 5, wherein the connection rotation unit comprises:
   a connection lever, which includes one end rotatably assembled with the connection frame, another end rotatably assembled with the keypad frame, and a rotation shaft positioned between the one end and the another end;
   a supporting bar indirectly connected to a rotation shaft of the connection lever to support; and
   a connection member for directly connecting the rotation shaft with the supporting bar.

10. The sliding device as claimed in claim 5, wherein the first guide and the second guide are formed with guide bars made of a plastic material so that the connection plate smoothly slides.

11. The sliding device as claimed in claim 5, wherein the connection rotation unit is positioned on the connection frame and the driving unit is positioned under the connection frame so that the connection rotation unit and the driving unit are symmetrically disposed relative to each other.

12. The sliding device as claimed in claim 5, wherein the display unit and the keypad unit slides away from each other from the main body so that a wider keypad mounting space can be secured in a widthwise direction of the portable apparatus.

13. A sliding device of a sliding-type portable terminal, comprising:
- a main body;
- a display unit arranged on the main body;
- a connection frame integrally connected with the display unit in a down direction and sliding-guided by a first set of inwardly facing horizontal guide rails while facing the main body;
- a keypad arranged between the display unit and the connection frame and sliding-guided by the second set of inwardly facing horizontal guide rails while facing the connection frame;
- a driving unit formed between the main body and the connection frame to provide power for semi-automatically sliding the display unit and the keypad; and
- a connection rotation unit mounted between the keypad and the connection frame so as to enable the sliding of the keypad in a reverse direction in response to the sliding of the display unit wherein the display unit and the keypad each slide in parallel alignment.

14. The sliding device of claim 13, wherein the display unit and the keypad unit slides away from each other from the main body so that a wider keypad mounting space can be secured in a widthwise direction of the portable apparatus.

15. A sliding device of a sliding-type portable terminal having a main body, a display unit sliding in one direction on the main body, and a keypad unit mounted on the main body to simultaneously slide in a reverse direction in response to the sliding of the display unit, the sliding device further comprising:
- a fixing plate formed on the main body;
- a connection frame integrally connected with a display unit plate formed in a lower surface of the display unit in a down direction of the display unit plate and sliding-guided by a first set of inwardly facing horizontal guide rails while facing the fixing plate;
- a keypad frame positioned between the display unit plate and the connection frame and sliding-guided by a second set of inwardly facing horizontal guide rails while facing the connection frame and the display unit plate; and
- a connection rotation unit mounted between the keypad frame and the connection frame so as to enable of the sliding of the keypad frame in a reverse direction of the one direction according to the sliding of the display unit plate in the one direction wherein the display unit and the keypad unit each slide in parallel alignment.

16. The sliding device of claim 15, wherein the display unit and the keypad unit slides away from each other from the main body so that a wider keypad mounting space can be secured in a widthwise direction of the portable apparatus.

17. A sliding device of a sliding-type portable terminal, comprising:
- a main body;
- a display unit arranged on the main body;
- a connection frame integrally connected with the display unit in a down direction and sliding-guided by a first set of inwardly facing horizontal guide rails while facing the main body;
- a keypad frame positioned between the display unit and the connection frame and sliding-guided by a second set of inwardly facing horizontal guide rails while facing the connection frame; and
- a connection rotation unit mounted between the keypad and the connection frame so as to enable the sliding of the keypad in a reverse direction in response to the sliding of the display unit wherein the display unit and the keypad unit each slide in parallel alignment.

18. The sliding device of claim 17, wherein the display unit and the keypad unit slides away from each other from the main body so that a wider keypad mounting space can be secured in a widthwise direction of the portable apparatus.

* * * * *